United States Patent [19]

Newland

[11] Patent Number: 5,266,880
[45] Date of Patent: Nov. 30, 1993

[54] BATTERY MONITORING CIRCUIT
[75] Inventor: Paul Newland, Middletown, N.J.
[73] Assignee: AT&T Bell Laboratories, Murray Hill, N.J.
[21] Appl. No.: 862,940
[22] Filed: Apr. 6, 1992
[51] Int. Cl.$^5$ .............................................. H02J 7/10
[52] U.S. Cl. ...................................... 320/14; 320/43; 320/48
[58] Field of Search ................. 320/5, 14, 43, 44, 48; 324/426, 427, 433, 434, 435

[56] References Cited

U.S. PATENT DOCUMENTS

| | | | |
|---|---|---|---|
| 4,724,528 | 2/1988 | Eaton | 320/43 X |
| 4,914,393 | 4/1990 | Yoshido | 320/48 X |
| 5,115,182 | 5/1992 | Ehmke et al. | 320/48 X |

Primary Examiner—Kristine L. Peckman
Attorney, Agent, or Firm—Samuel R. Williamson

[57] ABSTRACT

A battery monitoring circuit provides information as to the level of electrical energy remaining in a battery for determining an appropriate charging rate for the battery from multiple available rates. Such information is obtained without the need for measuring battery voltage and temperature during operation of a battery operated device or prior to the recharging of the battery. Each one of a plurality of representative values is assigned to represent each one of different current levels obtained from the battery while the battery operated device is operated in different current consuming states. The representative values are totaled for providing a measure of the total current consumption of the battery operated device for all periods of operation. In accordance with the measure of total current consumption for the periods of operation, representing the level of discharge in the battery, the battery is charged at one of the multiple available charging rates, i.e., fast, standard or trickle. While the battery is being charged, a count value derived from totaling the representative values is portionally reduced in accordance with the charging rate applied to the battery. As the count value decreases, the charge rate also decreases to a charge rate associated with the count level. The battery charging time is advantageously reduced thereby and an increase in battery life is achieved by limiting the application of only the trickle charging rate to a fully charged battery.

29 Claims, 5 Drawing Sheets

BATTERY MONITORING CIRCUIT

BACKGROUND OF THE INVENTION

1. Technical Field

This invention relates to battery monitoring devices, and more particularly to such devices for providing fast recharging of nickel-cadmium batteries and including controls therein to avoid overcharging such batteries.

2. Description of the Prior Art

The use of rechargeable nickel-cadmium (NiCad) batteries for consumer products is well established. Such rechargeable batteries are frequently used in communication devices such as cellular and cordless telephones and other mobile telecommunications products. Unlike disposable batteries, however, the NiCad batteries require recharging upon dissipation of the electrical energy stored therein. The recharging period of the NiCad batteries, if too long, may thus diminish the effectiveness of the device which incorporate the batteries. There have thus been prior art attempts to speed up the charge rate in order more quickly to restore the batteries to full capacity.

The normal recommended continuous charge rate for NiCad batteries is a standard charge rate which provides a 10 to 15 hour charge time at a C/6.5 to C/10 charge current, where C is the capacity of the battery in millamps-Hours. A Trickle Charge is an infinite charge time at a C/20 to C/30 charge current. A Fast Charge is a 2 to 4 hour charge time at a C/1.3 to C/2.7 charge current. And a Rapid Charge is a 15 to 30 minute charge time a 5 C to 2.5 C charge current. The standard charge rate thus results in a time of 10 hours or more to recharge a battery pack. Such a time requirement is excessive, however. If the batteries powering a device are discharged prior to completion of an operation or task, it is necessary for the user either to wait for a recharge or to replace the battery pack with a fully charged replacement pack. The first approach, as noted above, is typically highly time consumptive while the second is expensive.

Accordingly, the prior art has developed several approaches to reducing the recharge time for rechargeable batteries, including various techniques to avoid overcharging the units.

One approach for permitting the rapid charging of NiCad batteries is to charge the battery with a large amount of current (1 C to 2 C rate) and then employ monitors to measure either the change in voltage or change in temperature characteristics, or both. A fully charged battery that is subjected to a large charging current, however, will show a reduction in terminal voltage over time and and increase in temperature over time. Such detrimental effects are seen when large amounts of charging current are repeatedly used to charge a nearly full to fully charged battery.

In another approach to the problem, battery manufactures have conducted research into battery characteristics under charge and have developed special cells. Thus, some newer cells are characterized by a charge rate of C/3. These cells are capable of withstanding the higher charge rate indefinitely. The time required for fully charging such cells has thus been reduced to approximately four hours.

Although NiCad batteries containing these specially developed cells are capable of being charged at a higher rate than conventional NiCad batteries, batteries containing such cells are expensive. Also the cost of a device which includes sensors and circuitry for measuring battery voltage and temperature characteristics for determining battery capacity is similarly expensive because of these additional components.

SUMMARY OF THE INVENTION

In accordance with the invention, a battery monitoring circuit provides information as to the level of electrical energy remaining in a battery for determining an appropriate rate for recharging the battery. Such information is obtained without the need for determining battery voltage and temperature during operation of a battery operated device, such as a transceiver, or prior to the recharging of the battery.

In one aspect of the invention, the current consumption from the battery for each one of multiple different states in which the transceiver may operate is determined. In preferred embodiments, each one of a plurality of representative values is assigned to each of these states. For each period of time that the transceiver operates in a particular state, the assigned representative value is stored in an accumulator. This accumulator combines all of the representative values into a total representative value which provides a measure of the total current consumption of the transceiver for all periods of operation.

In another aspect of the invention, when the transceiver is associated with a battery charging device for charging the battery, in preferred embodiments, the charging rate of the battery is determined by the level of the total representative value stored in the accumulator. If, for example, the total representative value is indicative of a low or totally discharged battery, the battery is charged at a fast rate. If the total representative value is indicative of a partially charged battery, for example 65% to 85% of full capacity, the battery is charged at a standard rate. Lastly, if the total representative value is indicative of a nearly full to fully charged battery, the battery is charged at a trickle charge rate. While the battery is being charged, the total representative value stored in the accumulator is portionally reduced in accordance with the rate in which the battery is being charged. As the representative value decreases, the charge rate also decreases to that charge rate associated with the level of the total representative value then stored in the accumulator.

BRIEF DESCRIPTION OF THE DRAWING

This invention and its mode of operation will be more clearly understood from the following detailed description when read with the appended drawing in which.

DETAILED DESCRIPTION

Figure 1:
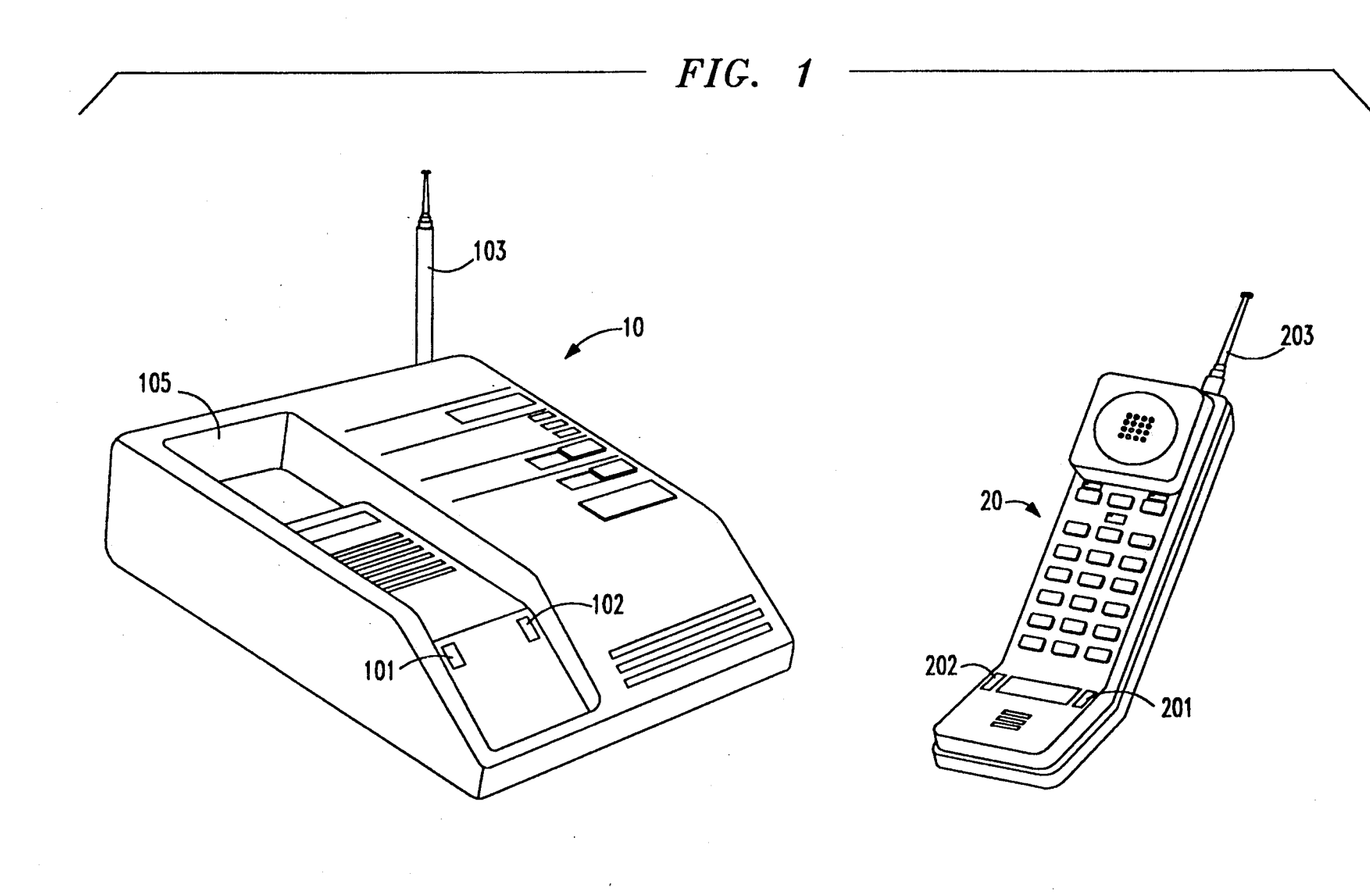
FIG. 1 shows perspective views of both a fixed station and a portable transceiver with which it communicates and to which the present invention may be applied.

Referring now to FIG. 1, there is shown a portable transceiver or battery operated device along with a fixed station with which it communicates. As illustrated, the portable transceiver may comprise a handset unit 20 and the fixed station may comprise a base unit 10 of a communication system to which the present invention may be applied.

In the operation of this communication system, the base unit 10 transmits to and receives signals from the handset unit 20 over an antenna 103 and couples these signals onto a telephone line (not shown). The handset unit similarly transmits and receives signals over an antenna 203 and is initially used to contact the base unit for enabling the placing of a call over the telephone line. In order to prevent an unauthorized user in possession of a handset unit from obtaining dial tone from the base unit, a randomly generated security code stored in the base unit 10 is transferred to the handset unit 20 while the handset unit is located in a mating cradle 105 in the base unit 10. A battery, which allows operation of the handset unit 20 while remote from the base unit 10, is normally charged when the handset unit 20 is placed in the base unit charging cradle 105. This battery is described later herein with reference to FIG. 2. A direct-current charging path for the battery is established over contacts 101 and 102 in the base unit 10 and contacts 201 and 202 in the handset unit 20 for charging of the battery. These contacts also allows transfer circuits in the base unit 10 and the handset unit 20 to respectively transmit and receive the security code and also the frequency channel over this path. A format suitable for transferring of the security code and other data over a direct-current charging path is described in U.S. Pat. No. 4,736,404 issued to R. E. Anglikowski, et al. on Apr. 5, 1988.

In the handset unit 20, a controlled power-up/power-down mode of operation is implemented. Power to a radio receiver, a control unit and certain other selected circuitry in the handset unit 20 are controlled to minimize power consumption when the handset unit 20 is in a standby-and-out-of-cradle state. The handset unit 20 resides in this state while not being used by a user in communicating with the base unit 10. Power to other non-essential circuitry in the handset unit is turned completely off during this power saving state.

During the power-up/power-down (battery saver) mode of operation, multiple events can cause the control unit to turn on to a full operating mode from the alternating power-up/power-down mode. A key depression on the handset unit, detection of a digitally formatted radio signal transmitted from the base unit 10, and the handset unit 20 being cradled in the base unit 10 for charging, are all events which cause the control unit in the handset unit 20 to turn on to the full operating mode and remain in this mode until processing on these events is completed.

A message format for the radio signals transmitted between the base unit and the handset unit is provided in the form of frequency shift keyed (FSK) signals and includes a data field. This data field may be in the form of either command opcode data or dial digit data, thereby allowing for many different commands or functions. The message format also includes a synchronizing signal that immediately precedes the data field. A format suitable for transmission of the data messages between the base unit 10 and the handset unit 20 is described in U.S. Pat. No. 4,731,814 issued to W. R. Becker et al. on Mar. 15, 1988.

Any communications between the base unit and the handset unit are established first through interpretation of the data field in the FSK signals. By way of example, when the base unit receives the incoming ringing signal on the telephone lines, it transmits the FSK signal with the ring-on opcode to the handset unit for changing the handset unit 20 from the alternating power-up/power-down mode to the full operating mode. But before the handset unit will respond to the base unit, a security code that the handset unit recognizes also must be in the data field received by the handset unit.

When a signal is transmitted on the frequency on which the handset unit 20 is monitoring, the handset unit receiver turns on and remains on in an AWAKE mode long enough to receive and interpret the security code transmitted by a base unit on this frequency. The security code identifies the transmitting base unit as being the correct base unit to which the handset unit should respond. All other signals received on this frequency without a security code that the handset unit recognizes are ignored. Once the handset unit has verified that the signaling base unit has the proper security code, it turns on to a full operating mode, in this instance the PHONE mode. If the handset unit does not recognize the code being transmitted by the base unit, it leaves the AWAKE mode and returns to the power-up/power-down mode of operation. This common security code is also included in any transmission of the FSK signals from the handset unit to the base unit and must similarly identify the handset unit as being the correct handset unit to which the base unit should respond. The handset unit receiver also remains in the AWAKE mode for approximately 10 seconds when ever a user goes on-hook, i.e., terminates a call while in the PHONE mode or INTERCOM mode.

Figure 2:
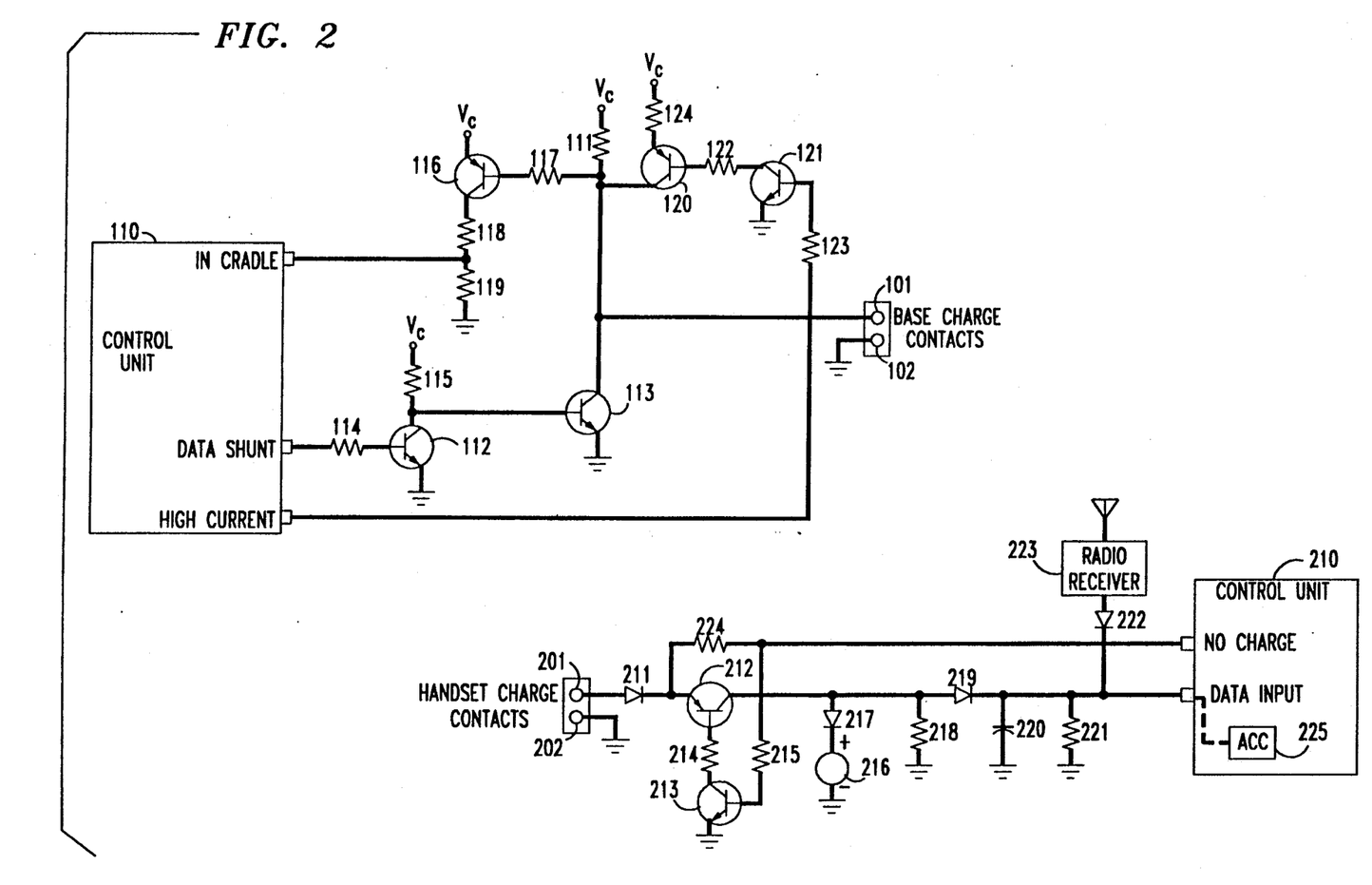
FIG. 2 shows circuitry of a battery depletion and charging arrangement in both the base unit and the handset unit shown in FIG. 1 and the interrelationship of this circuitry to other circuitry in this communication system, in accordance with the invention.

Referring now to FIG. 2, there is shown some of the circuitry of the battery depletion and charging arrangement in the base unit 10 and the handset unit 20 and also the interrelationship of this circuitry to other circuitry in this communication system. This circuitry advantageously reduces the time needed to charge the battery, typically a NiCad battery, used in the portable transceiver. In accordance with the invention, the control unit 210 in the handset unit 20 measures the amount of time the handset unit is in the BATTERY-SAVER mode, AWAKE mode and PHONE or INTERCOM mode. The control unit 210 in the handset unit 20 calculates the amount of electrical energy consumed by the handset unit when it is away from the base unit charging cradle. The total energy consumed is represented by a representative value stored in an accumulator associated with the control unit 210. In accordance with a feature of the invention, when the handset unit is returned to the cradle, a large amount of current is used to charge the battery for a time determined by the control unit's calculations. This fast charge of the battery returns the battery to 65% to 85% of its full capacity. Once in this state, the battery is charged at the standard charge rate until it is fully charged or nearly fully charged. Once fully charged, a trickle charge is applied indefinitely.

With reference to the general operational aspects of the circuitry, in accordance with the invention, when the handset unit is placed in the base charging cradle the base unit presents a C/6 charging current to the handset. After 15 seconds have passed, the handset unit checks the accumulator and if it contains a large value, the handset unit momentarily interrupts the charging current from the base unit for a first period of time. This momentary interrupt signals the base unit to raise the charging current to C/2 for 5 minutes. The handset unit then reduces its accumulator value by some amount. Five minutes later, if the accumulator still contains a large value the handset unit will again momentarily interrupt the charging current from the base unit. Again, the base unit will raise the charging current to C/2 for 5 minutes. The handset unit will continue this process until the value in the accumulator is below a certain value or thirty-six C/2 five minute charging cycles have taken place. Without the interruptions in charging current, the base unit charges the handset at a C/6 rate. When a base unit has been charging a handset unit at the C/6 rate for 10 hours without current interruptions (either to request C/2 or C/20 charge currents or because the handset unit has been removed from the cradle) the base unit automatically reduces the charge current to C/20, a trickle charge rate. Use of the trickle charge rate for long term charging rather than C/6, the standard charge rate, ensures that the battery's useful life is extended beyond that which it would have been if it were continually charged at the C/6, rate or higher.

Communications between the base unit 10 and the handset unit 20 are provided by the control unit 110 in the base unit 10 and the control unit 210 in the handset unit 20. Control units 110 and 210 may be implemented quite easily through the use of commercially available microprocessors from semiconductor manufacturers such as Hitachi, National and NEC. A current charge circuit in the base unit 10 interfaces the control unit 110 and the control unit 210 in the handset unit 20 via a complementary current receiving circuit in the handset unit 20.

With reference first to the base unit current charge circuit, a resistor 111 connects to a voltage source $V_c$ for providing a standard charging current of C/6 (45 millamps) to the output terminals 101 and 102 of the base unit 10. For communicating security code, frequency channel and other data to the handset unit 20, the charge current provided through resistor 111 is modulated on and off by switching transistors 112 and 113. A series of pulses are generated thereby which are received and decoded by the control unit in the handset unit 20. The appropriate bias is provided to transistor 112 by resistors 114 and 115 and the voltage source provided by voltage $V_c$. Transistors 112 and 113 also provide a trickle charge current for charging the handset battery by shunting the C/6 current to ground under control of a 80% duty cycle signal from the control unit 110 in the base unit 10. This arrangement is meant to be illustrative in conveying the principles of the invention. It is therefore to be understood that a more optimum but less illustrative arrangement may be employed in the practice of the invention. By way of example, to avoid the power dissipation incurred in the illustrated arrangement, an alternative arrangement may be achieved by adding a transistor to shut off altogether the current flow to the handset unit 20. In such an alternative arrangement, this transistor may be connected to another data port on the control unit 110 for controlling the current flowing to the handset unit 20.

Transistor 116 and resistors 117, 118 and 119, in combination, form an in-cradle detector for informing the control unit 110 when the handset unit 20 is in the charging cradle or whenever there is a momentary interruption provided by the handset unit 20 of current being delivered to the handset unit. Responsive to a high current signal from the control unit 110, transistors 120 and 121, and their associated resistors 122 and 123, provide the control for the C/2 charge current to the handset unit 20. This charge current is provided by a voltage source $V_c$ which is coupled through resistor 124 to the transistor 120. The parallel combination of resistors 111 and 124, via transistor 120, provide the increased current to the handset unit via the base contacts 101 and 102.

With reference to the handset unit current receiving circuit, the charging current from the base unit is coupled into the handset unit 20 via charging contacts 201 and 202. Coupled to charging contact 201 is a diode 211 for insuring that the current flow across the contacts 101-102 and 201-202 is into the handset unit 20 only. Transistors 212 and 213, along with resistors 214 and 215, provide a means for the control unit 210 to interrupt the charging current from the base unit 10 to signal the base unit to adjust the current being provided in some manner, i.e., either increase or decrease this current. A path to charge the battery 216 is provided through a diode 217 and a path to ground for the pass transistor 212 is provided by the resistor 218. A diode 219, a capacitor 220 and a resistor 221 comprise an amplitude detector for receiving the security code, frequency channel and other data provided from the control unit 110 to the control unit 210. A diode 222, along with diode 219 and resistor 221, forms an OR gate for coupling data from the base unit 10 as well as coupling received data from the radio receiver 224. When the current receiving circuit is not receiving power from the base unit 10, the data ordinarily provided over the charge contacts is received by the receiver 223 and provided to the control unit 210 via the diode 222. A measure of the voltage potential across resistor 221 is provided to the control unit 210 to also reflect whether there is a charge being provided to the charging circuit in the handset unit.

A 24 bit unsigned accumulator (ACC) 225 is provided within the control unit 210 of the handset unit 20. An accumulator value of zero is indicative of the battery 216 being fully charged and larger positive values are proportionally indicative of a greater reduction in battery energy. The controlling program in the control unit 210 limits the lowest decremented value of the accumulator 225 to zero. Additionally, the controlling program does not allow the accumulator to be incremented further when it contains values equal to or larger than 2,500,000.

The accumulator keeps track of battery usage, in accordance with the invention, by being incrementable in a rate proportioned to the rate of current drain the handset unit 20 presents to the battery 216. In general, for every half milliampere-second (0.5 mA-S) of battery use the accumulator is incremented by one unit. For every 0.75 mA-S of charging the accumulator is decremented by one unit, but not past zero. For every cycle of battery-saver operation by the handset unit (i.e., out of cradle but not in use) the accumulator is incremented by 1 (0.5 mA-S). For every second that the handset unit is in the AWAKE mode, the accumulator is incremented by 40 (20 mA-S) and for every second that the handset is in the PHONE or INTERCOM mode, the accumulator is incremented by 80 (40 mA-S). Thus the current drain of the battery 216 for all of the different modes that the handset unit may operate in is known and a suitable value representation of such current drain is accordingly assigned in the accumulator 225. Similarly, the charging rate of the battery 216 is also known and a suitable value also is assigned in the accumulator representative of each charge rate applied to the battery 216.

Fifteen seconds after the handset unit is returned to the cradle the handset unit will check the value of the accumulator. If the accumulator value is greater than 500,000 the handset unit will interrupt the charging current for 35 milliseconds, decrement the accumulator by 54,000 and start a five minute timer. The base unit, seeing the momentary current interruption, will increase the charge current to C/2 (135 mA) for 5 minutes (40,500 mA-S). When the 5 minute handset unit timer expires, the handset unit will again check the value of its accumulator. If the accumulator is still greater than 500,000, the five minute cycle will repeat, as indicated earlier herein, up to 36 times.

When a new battery is installed in the handset unit, the accumulator will be set to a value of 500,000, the equivalent value of a battery that has just completed a fast charging cycle. Thus the new battery will not get the benefit of fast charging when it is initially installed. It will be fully charged after 9 hours at the C/6 rate, however. To guard agains static discharge or other transient voltages providing an erroneous count in the accumulator, a watchdog timer (not shown) in the control unit 210 resets the accumulator to a value of 500,000, the same as a partially charged battery whenever an interruption of the battery voltage occurs in the handset unit 20.

Figure 3:
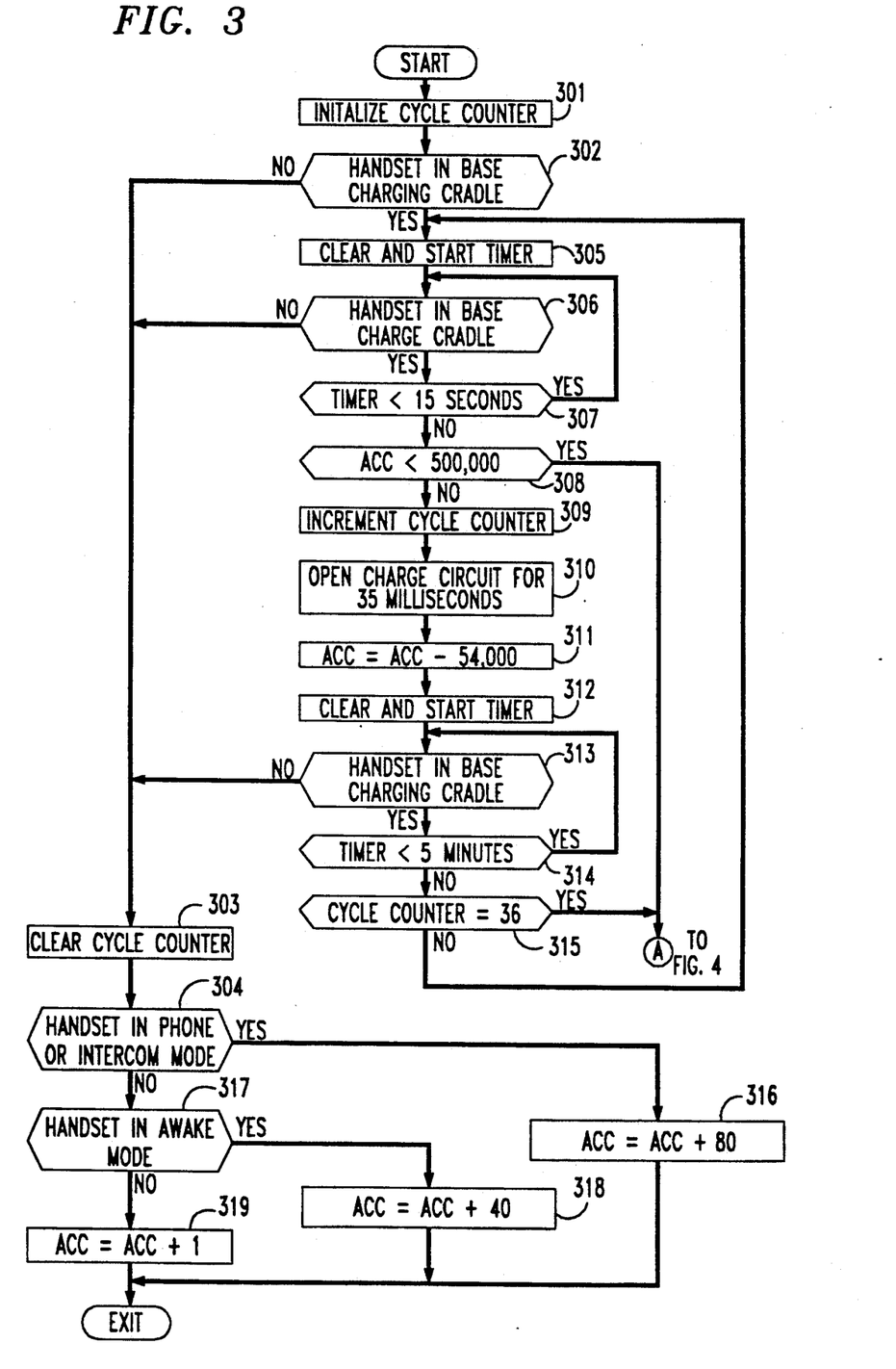
FIGS. 3 and 4 are flow diagrams of a process suitable for incorporation into the handset unit of the communication system shown in FIG. 1, in accordance with the invention.
Figure 4:
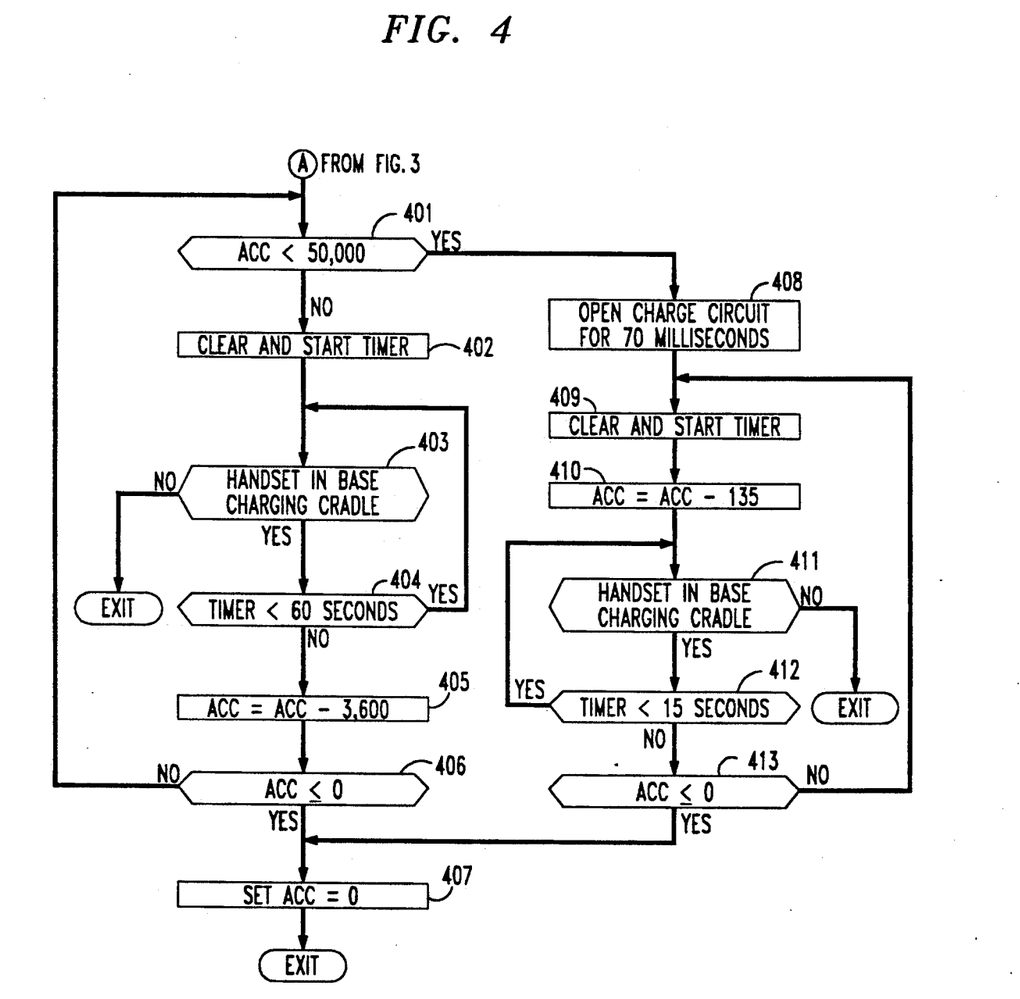

Referring next to FIGS. 3 and 4, in combination, there are shown flow charts illustrating the operation of the handset unit 20 in performing the process which monitors the electrical energy consumption of the battery in this handset unit and also provides for recharging the handset unit battery in accordance with the computed level of discharge of the battery. The functions performed by control unit 210 are advantageously determined by a process or program contained in the ROM located in this control unit. The process is executed at the same rate that the handset is operated at in the BATTERY-SAVER mode. For example, if the handset unit is activated into the ON state every 500 milliseconds, as earlier described herein, then this process is also entered every 500 milliseconds. If a battery saver mode interval other than 500 milliseconds is employed, some of the constant values used in the process may require suitable scaling.

A handset unit operating in the BATTERY-SAVER mode draws 1 millamp, on average, from the battery with a typical cycle time of 500 milliseconds in length. This cycle includes an ON time of approximately 16 milliseconds for the receiver in the handset unit within this period. The handset unit operating in the AWAKE mode draws 20 millamps from the battery. In this mode, the receiver in the handset unit and other minimum circuitry are turned ON while the receiver monitors any signals appearing on its assigned channel for a signal from the transmitter in its assigned base unit. The handset unit operating in the PHONE or INTERCOM mode draws 40 millamps from the battery.

The process is entered at step 301 where the cycle counter is initialized at zero. From this step, the process advances to decision 302 where a determination is made as to whether the handset unit is in the charging cradle on the base unit. If the handset unit is not in the cradle on the base unit, the process advances to step 303 where the cycle counter is cleared of any values it then contains. From the step 303, the process advances to decision 304 for determining whether the handset unit is in the PHONE or INTERCOM mode. If the handset unit is determined to be in the cradle at decision 302, the process advances from the decision to step 305. In step 305, a 15 second timer is cleared and started. The process next advances to step 306 where a check is again made to see if the handset unit is still in the base charging cradle. If it is not, the process again advances to step 303. If the handset unit still remains in the charging cradle, the process advances to decision 307 where the 15 second timer is checked to see if 15 seconds have elapsed. If the elapsed time is less that 15 seconds, the process returns to decision 306 and ascertains the presence or absence of the handset unit in the base charging cradle. When 15 seconds have elapsed the process advances to decision 308 where the value of the accumulator is determined. This is achieved in decision 308 by comparing the value in the accumulator with a constant value of 500,000 units. If the value in the accumulator is less than 500,000 units, the process advances to the routine shown in FIG. 4, described later herein.

If the value in the accumulator is greater than 500,000 units then the process advances to step 309 where the cycle counter is incremented. From step 309, the process advances to step 310. In step 310, the handset unit interrupts the charging current from the base unit for 35 milliseconds. The base unit, seeing this momentary current interruption, increases the charge current to C/2 (135 milliamps) for 300 second (40,500 mA-S). The process next advances to step 311 where the accumulator is decremented by 54,000 units. The 54,000 units are indicative of the 40,500 mA-S charge that is applied the battery in the handset unit. The process next advances to step 312 where a five minute timer is cleared and started. This timer delays the handset from requesting another high current charge interval until the base unit has completed the charge interval then in progress. The process next advances to decision 313 where it is determined if the handset unit is still in the base unit charging cradle. If the handset unit is no longer in the base unit charging cradle, then the process advances to step 303. If the handset unit is still in the base unit charging cradle, however, then the process advances to decision 314 where it is determined if the 5 minute timer has expired. If this timer has not expired, then the process returns to step 313, forming a loop that is terminated when either the timer reaches 5 minutes or the handset unit is removed from the base unit charging cradle. If the timer reaches 5 minutes before the handset unit is removed, the process advances to the decision 315 where the count in the cycle counter is examined. If this count equals 36, the process advances to the routine shown in FIG. 4. If the count has not reached 36, then the process returns to the decision 302 and the routine is repeated. If the value remaining in the accumulator is greater than 500,000 during subsequent executions of the process in this routine, the process will be repeated up to 36 times. Thus the battery in the handset unit will be charged at a fast charging rate C/2 for 36 five minute periods.

Whenever the handset unit is removed from the base unit cradle, the process advances to step 303 and then to decision 304 where a test is performed to see if the handset unit is in either the PHONE or INTERCOM mode. If in one of these two modes, the process advances to step 316 where the accumulator is incremented by 80 units and the routine is exited. If the handset unit is not in either the PHONE or INTERCOM mode then the process advances to decision 317. In this decision, the process checks to see if the handset unit is in the AWAKE mode. If so, the process advances to step 318 where the accumulator is incremented by 40 units. From Step 318, the routine is exited. If the handset unit is not in the AWAKE mode then it is assumed to be in the BATTERY SAVER or SLEEP mode and the process advances to step 319 where the accumulator is incremented by 1 unit. From step 319, the routine is also exited.

With reference to FIG. 4, the process at both decisions 308 and 315, shown in FIG. 3, advance to the decision 401, under conditions defined by these decisions. At decision 401, the value in the accumulator at this point in the process is determined. This is achieved in this decision by comparing the value in the accumulator with a constant value of 500,000 units. If the value in the accumulator is greater than 50,000 units, then the handset unit battery will be charged at the C/6 standard charging rate and the process advances to step 402 where a 60 second timer is cleared and started. From step 402, the process advances to decision 403 where it is determined if the handset unit is in the base charging cradle. If not, the process is terminated and the routine is exited. If the handset unit is in the base unit cradle, the process advances to decision 404 where the 60 second timer is examined. If 60 seconds have not elapsed, the process returns to the decision 403 and determines if the handset unit is still in the base charging cradle. If 60 seconds have elapsed, then the process advances to step 405 where the accumulator is decremented 3,600 units. This value is indicative of the battery being charged at the C/6 standard rate for one minute.

From step 405, the process advances to the decision 406 where it is determined if the accumulator was decremented to zero or less than zero. If not zero or less that zero, the process returns to the decision 401. If the value of the accumulator was decremented to zero or less than zero, the process advances to step 407 where the accumulator value is set to zero.

Returning once again to the decision 401, if the accumulator value is ever less than 50,000 at this decision, then the process advances to the step 408. When the process advances to this step, the unit count in the accumulator is indicative of a condition that the battery is essentially fully charged and that the base unit should be signaled to provide a trickle charge of C/20. At the step 408, the current charging path between the base unit and the handset unit is interrupted for 70 milliseconds by the handset unit. This 70 millisecond interruption is interpreted by the base unit to start sending charging current at the C/20 level.

From the step 408, the process advances to step 409 where a 15 second times is cleared and started. From this step, the process advances to step 410 where the accumulator is decremented 135 units. A decrementation of 135 units is indicative of the battery being charged at the C/20 trickle current rate for 15 seconds. From the step 410, the process advances to the decision 411 where it is determined if the handset unit is still in the base unit charging cradle. If not, the routine is exited. If the handset unit is in the charging cradle, then the process advances to the decision 412 where it is determined whether the 15 second timer has expired. If the timer has not expired, the process returns to decision 411. If the timer has expired, then the process advances to the decision 413. At the decision 413, it is determined whether the accumulator was decremented to zero or less than zero. If not zero or less than zero, the process returns to the step 409 where the timer is restarted. If the value of the accumulator was decremented to zero or less than zero, the process advances to step 407 where the accumulator value is set to zero. From step 407, the routine is exited.

Figure 5:
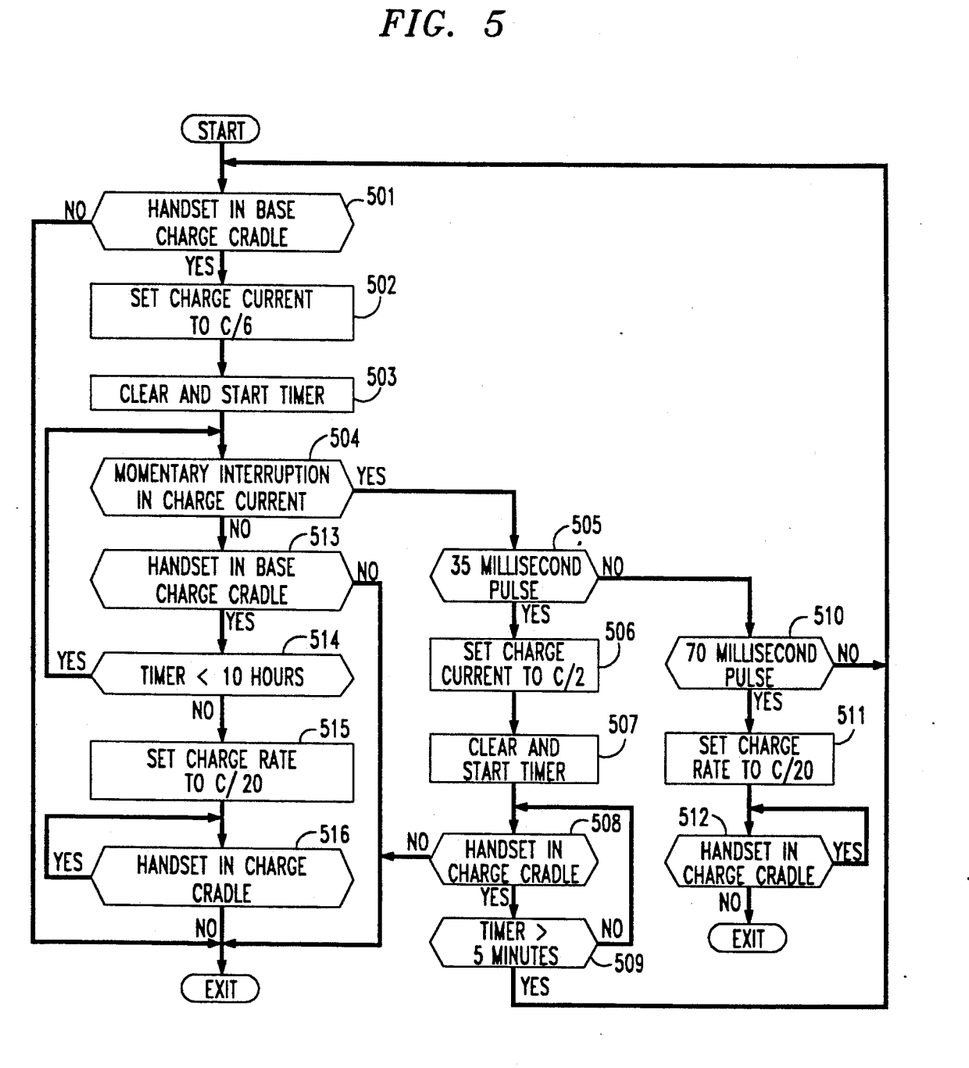
FIG. 5 is a flow diagram of a process suitable for incorporation into the base unit of the communication system shown in FIG. 1, in accordance with the invention.

With reference to FIG. 5, there is shown a flow chart illustrating the operation of the base unit in performing the battery charging operation in accordance with the level of electrical energy discharged from a battery. The process is entered at step 501 where the base unit determines if the handset unit is present in the charging cradle of the base unit. This process is entered periodically, for example, every 0.5 to 10 seconds. If the handset unit is determined not to be in the base unit charging cradle then the routine is exited. If the handset unit is in the base unit charging cradle, however, the process advances to step 502. In this step 502, the charging current is set to the standard charging rate C/6.

The process next advances to step 503 where a ten hour timer is cleared and restarted. The process next advances to decision 504 and determines if there has been a momentary interruption in the charge current by the handset unit. If a momentary interruption has occurred, then the process advances to decision 505 where the length of the momentary interruption or pulse is examined. If the pulse is determined to be approximately 35 milliseconds in length, then the process advances to step 506 where the charge current is set to the fast rate C/2. From step 506, the process advances to step 507 where a five minute timer is cleared and started. This timer determines the length of time that the charge current is provided at the fast rate C/2. From step 507, the process advances to decision 508 where it is determined whether the handset unit is still in the base unit charging cradle. If not, then the routine is exited. If the handset unit is still in the cradle, then the process advances to decision 509. In this decision, a determination is made as to whether the five minute timer has exceeded 5 minutes. If not, the process returns to the decision 508. If the timer has expired, the process returns to decision 501.

Referring once again to decision 505, if the pulse is determined to be greater than 35 milliseconds, the process advances to the decision 510 where the length of the momentary interruption is also examined. If the pulse is determined to be approximately 70 milliseconds in length, then the process advances to step 511 where the charge current is set to a trickle charging rate C/20. If the momentary interruption was not 70 milliseconds in length, then the process returns to the decision 501 where a check is made to see if the handset was removed from the cradle in the base unit. From step 511, the process advances to the decision 512. At this decision, the process monitors the handset cradle for the presence of the handset unit. If the handset unit is not in the charging cradle the routine is exited. Otherwise, the process remains at and loops around this decision while the current is being provided to the battery at the trickle charge rate.

Referring once again to decision 504, if a momentary interruption of the charge current has not been detected, the process advances to decision 513 where a test is performed to see if the handset unit still remains in the base unit charging cradle. If the handset unit is not in the charging cradle then the routine is exited. If the handset unit is in the base unit charging cradle, then the process advances to decision 514 where the timer is checked to determine if its value is less than 10 hours. If the timer value is less than 10 hours then the process returns to decision 504 and looks for a momentary interruption in the charge current. If the timer has exceeded 10 hours then the base unit considers the battery in the handset unit to be fully charged and the process advances to step 515 where the charging current is set to C/20, the trickle charge rate. The process next advances to decision 516 where, once again, a test is made to see if the handset unit is in the charging cradle. If the handset unit is not in the charging cradle the routine is exited. Otherwise, the process remains at and loops around this decision while the current is being provided to the battery at the trickle charge rate.

Various modifications of battery charging operation are possible in accordance with the invention. An example of such a modification is in the operation of the accumulator shown in FIG. 2 and generally described with reference to FIG. 3. An accumulator may be arranged to be incremented to some large value for reflecting a battery in a fully charged state. This accumulator may then be decremented with each use of the battery while the transceiver is in one of multiple possible current consuming states.

Another modification involves the process generally described in FIGS. 3, 4 and 5. In this modification, circuitry which permits bidirectional communications across the charge contacts 101-102 and 201-202 may be included in the design. With such circuitry, a data message may be sent from the control unit 210 to the control unit 110 to, for example, request a high charging rate C/2 for five minutes or to inform the control unit 110 that the battery is fully charged and to begin providing the current at a trickle charge C/6 charging rate.

Various other modifications of this invention are contemplated and may obviously be resorted to by those skilled in the art without departing from the spirit and scope of the invention as hereinafter defined by the appended claims.

I claim:

1. A method of determining the discharge level of a battery providing operating power for a portable transceiver, the method comprising the steps of:
    operating the portable transceiver in a plurality of different current consuming states;
    assigning a plurality of representative values, each one of the plurality of representative values representing a level of the current consumed by the transceiver from the battery while operating in each one of the plurality of current consuming states;
    accumulating a total representative value from each one of the plurality of representative values for obtaining a level of total current consumed by the transceiver from the battery, the accumulated total representative value being indicative of accumulated time periods during which the portable transceiver operates in each of said current consuming states; and
    assigning a level for the total representative value in the absence of said plurality of representative values, the assigned total representative value being indicative of the discharge level of the battery when said battery is partially charged.

2. The method of claim 1 further comprising the steps of associating the transceiver with a battery charging device, determining the magnitude of the total representative value stored in an accumulator by the accumulating step or assigned to the accumulator by the total representative value level assigning step, charging the battery by said charging device, and decrementing the magnitude of the total representative value in accordance with the level of current being provided to the battery by the charging step.

3. The method of claim 2 further comprising the step of selecting a battery charging rate from one of multiple rates available from the battery charging device, the charging rate being selected responsive to the magnitude of the total representative value in the accumulator.

4. The method of claim 3 wherein the multiple charging rates include a fast charging rate, a standard charging rate and a trickle charging rate.

5. The method of claim 4 wherein the discharge level of the battery is represented by a total representative value of a first maximum magnitude when said battery is fully or near fully charged, responsive to the total representative value in the accumulator being at or below the first maximum magnitude, the selecting step selecting the trickle charging rate for charging the battery.

6. The method of claim 5 wherein the discharge level of the battery is represented by a total representative value of a second maximum magnitude when said battery is partially charged, responsive to the total representative value in the accumulator being at or below the second maximum magnitude, the selecting step selecting the standard charging rate for charging the battery.

7. The method of claim 6 wherein the discharge level of the battery is represented by a total representative value of a third maximum magnitude when said battery is discharged, responsive to the total representative value in the accumulator being at or below the third maximum magnitude, the selecting step selecting the fast charging rate for charging the battery.

8. The method of claim 7 wherein the total representative value of the first maximum magnitude is less than the total representative value of the second maximum magnitude and the total representative value of the second maximum magnitude is less than the total representative value of the third maximum magnitude.

9. The method of claim 8 wherein responsive to the charging step decrementing the magnitude of the total representative value to below the value represented by the second maximum magnitude, the selecting step selecting the standard charging rate for the battery.

10. The method of claim 8 wherein responsive to the charging step decrementing the magnitude of the total representative value to below the value represented by the first maximum magnitude, the selecting step selecting the trickle charging rate for the battery.

11. The method of claim 1 wherein the plurality of different current consuming states includes a first state wherein the level of current consumed is assigned a first representative value by the assigning step.

12. The method of claim 11 wherein the plurality of different current consuming states includes a second state wherein the level of current consumed is assigned a second representative value by the assigning step, the second representative value being larger than the first representative value.

13. The method of claim 12 wherein the plurality of different current consuming states includes a third state wherein the level of current consumed is assigned a third representative value by the assigning step, the third representative value being larger than the second representative value.

14. A battery monitoring circuit for determining the discharge level of a battery providing operating power for a portable transceiver, the portable transceiver operating in a plurality of different current consuming states, the monitoring circuit comprising:

means for monitoring the operation of the portable transceiver while in each of the plurality of different current consuming states;

means for assigning a plurality of representative values, each one of the plurality of representative values representing a level of the current consumed by the transceiver from the battery while operating in each one of the plurality of current consuming states;

means for accumulating a total representative value from each one of the plurality of representative values for obtaining a level of the total current consumed by the transceiver from the battery, the accumulated total representative value being indicative of accumulated time periods during which the portable transceiver operates in each of said current consuming states; and means for assigning a level for the total representative value in the absence of said plurality of representative values, the assigned total representative value being indicative of the discharge level of the battery when said battery is partially charged.

15. The battery monitoring circuit of claim 14 wherein the plurality of different current consuming states includes a first state wherein the level of current consumed is assigned a first representative value by the means for assigning the plurality of representative values.

16. The battery monitoring circuit of claim 15 wherein the monitoring means includes means for monitoring the operation the portable transceiver in a power on/power-off cycling mode, the transceiver consuming current at the first representative value while operating in this mode.

17. The battery monitoring circuit of claim 15 wherein the plurality of different current consuming states includes a second state wherein the level of current consumed is assigned a second representative value by the means for assigning the plurality of representative values, the second representative value being larger than the first representative value.

18. The battery monitoring circuit of claim 17 wherein the plurality of different current consuming states includes a third state wherein the level of current consumed is assigned a third representative value by the means for assigning the plurality of representative values, the third representative value being larger than the second representative value.

19. The battery monitoring circuit of claim 18 wherein the operating means includes means for operating the portable transceiver in a full power-on mode, the transceiver consuming current at the third representative value while operating in this mode.

20. The battery monitoring circuit of claim 14 further comprising interconnecting means connecting the transceiver with a battery charging device, responsive to the interconnecting means, the battery charging device providing charging current to the battery at one of multiple available rates and the decrementing means decrementing the magnitude of the total representative value in accordance with one of the multiple rates of said charging current.

21. The battery monitoring circuit of claim 20 further comprising means for selecting a battery charging rate from the multiple rates from the battery charging device, the charging rate being selected responsive to the magnitude of the total representative value stored in an accumulator by the accumulating means or assigned to the accumulator by the total representative value level assigning means.

22. The battery monitoring circuit of claim 21 wherein the multiple charging rates include a fast charging rate, a standard charging rate and a trickle charging rate.

23. The battery monitoring circuit of claim 22 wherein the discharge level of the battery is represented bu a total representative value of a first maximum magnitude when said battery is fully or near fully charged, responsive to the total representative value in the accumulator being at or below the first maximum magnitude, the selecting means selecting the trickle charging rate for charging the battery.

24. The battery monitoring circuit of claim 23 wherein the discharge level of the battery is represented by a total representative of a second maximum magnitude when said battery is partially charged, responsive to the total representative value in the accumulator being at or below the second maximum magnitude, the selecting means selecting the standard charging rate for charging the battery.

25. The battery monitoring circuit of claim 24 wherein the discharge level of the battery is represented by a total representative value of a third maximum magnitude when said battery is discharged, responsive to the total representative value in the accumulator being at or below the third maximum magnitude, the selecting means selecting the fast charging rate for charging the battery.

26. The battery monitoring circuit of claim 25 wherein the total representative value of the first maximum magnitude is less than the total representative value of the second maximum magnitude and the total representative value of the second maximum magnitude is less than the total representative value of the third maximum magnitude.

27. The battery monitoring circuit of claim 26 wherein responsive to the decrementing means decrementing the magnitude of the total representative value to below the value represented by the second maximum magnitude, the selecting means selecting the standard charging rate for the battery.

28. The battery monitoring circuit of claim 26 wherein responsive to the decrementing means decrementing the magnitude of the total representative value to below the value represented by the first maximum magnitude, the selecting means selecting the trickle charging rate for the battery.

29. In a communication system, a battery monitoring circuit for determining the discharge level of a battery providing operating power for a portable transceiver capable of operating in a plurality of different current consuming states, the monitoring circuit comprising:

means for monitoring the operation of the portable transeceiver while in each of the plurality of different current consuming states;

means for assigning a plurality of representative values, each one of the plurality of representative values representing a rate of current consumed by the transceiver from the battery while operating in each one of the plurality of current consuming states;

means for accumulating a total representative value from each one of the plurality of representative values for obtaining a level of total current consumed by the transceiver from the battery, the accumulated total representative value being indicative of accumulated time periods during which the portable transceiver operates in each of said current consuming states;

means for assigning a level for the total representative value in the absence of said plurality of representative values, the assigned total representative value being indicative of the discharge level of the battery when said battery is partially charged;

interconnecting means for connecting the transceiver to battery charging means for providing charging current to the battery at one of multiple available rates; and means for decrementing the magnitude of the total representative value in accordance with the level of said charging current being provided to the battery.

* * * * *